US012265029B2

(12) United States Patent
Wu

(10) Patent No.: US 12,265,029 B2
(45) Date of Patent: Apr. 1, 2025

(54) APPARATUS COMPRISING A FIRST LENS, A SECOND LENS, A THIRD LENS, A FIRST OPTICAL FIBER, A SECOND OPTICAL FIBER, AND A SPECTROMETER FOR SPECTRAL ANALYSIS

(71) Applicant: EZCONN CORPORATION, New Taipei (TW)

(72) Inventor: Chin-Tsung Wu, New Taipei (TW)

(73) Assignee: EZCONN CORPORATION, New Taipei (TW)

( * ) Notice: Subject to any disclaimer, the term of this patent is extended or adjusted under 35 U.S.C. 154(b) by 254 days.

(21) Appl. No.: 18/157,590

(22) Filed: Jan. 20, 2023

(65) Prior Publication Data

US 2023/0258565 A1 Aug. 17, 2023

(30) Foreign Application Priority Data

Jan. 21, 2022 (TW) .................................. 111200862

(51) Int. Cl.
*G01J 3/02* (2006.01)
*G01J 3/44* (2006.01)
(Continued)

(52) U.S. Cl.
CPC ........ *G01N 21/6428* (2013.01); *G01J 3/0208* (2013.01); *G01J 3/0218* (2013.01); *G01J 3/4406* (2013.01); *G01N 21/6486* (2013.01); *G01N 2021/6421* (2013.01); *G01N 2021/6439* (2013.01); *G01N 2021/6484* (2013.01); *G01N 2201/08* (2013.01)

(58) Field of Classification Search
CPC .......... G01J 3/02; G01J 3/0202; G01J 3/0205; G01J 3/0208; G01J 3/0218; G01J 3/4406; G01N 21/01; G01N 2021/0106; G01N 2021/0112; G01N 21/17; G01N 21/31; G01N 21/63; G01N 21/64; G01N 2021/6421; G01N 21/6428; G01N 2021/6439; G01N 2021/6484; G01N 21/6486
USPC ........................................................ 356/326
See application file for complete search history.

(56) References Cited

U.S. PATENT DOCUMENTS 6,072,568 A * 6/2000 Paton .................... G01N 21/64
73/800
7,835,599 B2 * 11/2010 Beaulieu .............. G01N 21/645
385/12

(Continued)

*Primary Examiner* — Allen C. Ho
(74) *Attorney, Agent, or Firm* — RANKIN, HILL & CLARK LLP

(57) ABSTRACT

An apparatus for spectral analysis comprises a first lens holder comprising a first lens, a second lens holder comprising a second lens, a first optical fiber, and a spectrometer. The first lens and the second lens are for receiving a scattered light beam and focusing it to a point. The first optical fiber is arranged between the first lens holder and the second lens holder. The first optical fiber receives a first light beam focused by the first lens, transmits the first light beam through, and then projects the first light beam on the second lens. The spectrometer is positioned on a side of the second lens holder opposite the first optical fiber. The second lens focuses the first light beam received from the first optical fiber and projects the first light beam onto the spectrometer so that the spectrometer can analyze the first light beam.

14 Claims, 3 Drawing Sheets

(51) Int. Cl.
    *G01N 21/01*      (2006.01)
    *G01N 21/64*      (2006.01)

(56) References Cited

U.S. PATENT DOCUMENTS

| | | | |
|---|---|---|---|
| 9,599,507 B2 * | 3/2017 | Pawluczyk | G01J 3/0221 |
| 10,088,468 B2 * | 10/2018 | Cafferty | G01J 3/0291 |
| 11,604,162 B2 * | 3/2023 | Wang | G01J 3/18 |
| 11,892,413 B2 * | 2/2024 | Rosenzweig | G01N 21/6489 |

\* cited by examiner

APPARATUS COMPRISING A FIRST LENS, A SECOND LENS, A THIRD LENS, A FIRST OPTICAL FIBER, A SECOND OPTICAL FIBER, AND A SPECTROMETER FOR SPECTRAL ANALYSIS

RELATED APPLICATIONS

This application claims priority to TW Application Ser. No. 111200862, filed on Jan. 21, 2022, which is incorporated herein by reference in its entirety.

TECHNICAL FIELD

This invention pertains generally to spectral analyses, and more particularly, to an apparatus for spectral analysis used in a polymerase chain reaction (PCR) technology.

BACKGROUND

Polymerase chain reaction (PCR) is a powerful technique for detecting a nucleotide sequence of a genetic material (DNA or RNA) and is generally used to detect and identify particular organisms such as viruses or bacteria. Every organism has its unique genetic code that distinguishes it apart from other organisms, however, amounts of genetic materials are often too small to be detected when performing nucleic acid analysis. Therefore, the PCR technique is adopted so as to amplify or produce multiple copies of a target genetic material. Every amplification performed represents 1 threshold cycle ($C_T$) value, the amplification can be calculated as 2 to the power of n ($2^n$), where n is the $C_T$ value or the number of amplifications. Particularly, for ultra-small viruses like coronavirus, concentrations of viral RNA can only be detected through the process of PCR, that is, the target genetic material of the virus is copied multiple times until the signal becomes large enough to be detected. For every PCR amplification performed, the genetic signal becomes twice as large as the original, and the $C_T$ value is increased by 1. For instance, if PCR amplification is performed twice, the genetic signal will become $2^2$ times larger than the original signal, and the $C_T$ value will be 2. $C_T$ values are directly correlated with infection rates. If the concentration of viral RNA is high, the number of PCR amplifications required to detect the signal will be low, the $C_T$ value will also be smaller indicating a higher infection rate. On the contrary, if the concentration of viral RNA is low, more times of PCR amplifications will be needed, and the $C_T$ value will be larger representing a lower infection rate.

The conventional PCR detection technique utilizes a fluorescent dye to mix with a collected sample, a mixture is formed and poured off into a test tube. A specific light source such as LED and a spectrometer are arranged on the sides of the test tube opposite each other. A light beam from the light source is transmitted through the air toward the test tube, once it hits the fluorescent dye in the test tube, the fluorescence is scattered from the test tube. A portion of the scattered fluorescence is then collected and focused onto the spectrometer by a lens located between the test tube and the spectrometer, so that the spectrometer can perform the spectral analysis. Such an optical path is called free space alignment.

However, there are some drawbacks to the conventional PCR detection technique, such as poor light signal receptions and limitations to the component arrangement. Concerning the first point, the slit of a spectrometer that allows a light beam to enter is very small, which makes the reception of the light signal weak. Regarding the second point, the spectrometer needs to be combined with a PCB assembly, which is very space-consuming and is limited to a certain location that is too close to the fluorescent dye.

SUMMARY

It is an object of the present invention to provide an improved apparatus for spectral analysis used in PCR detection that overcomes the abovementioned problems. This object is achieved in accordance with the invention by utilizing an optical fiber with a predetermined length to transmit the light signal. The diameter of an optical fiber is larger than that of the entrance slit of a spectrometer, which improves the overall coupling efficiency. Moreover, it also adds flexibility to the component positioning. The optical fiber used in the present invention can be of any length, which makes locating the spectrometer no longer a problem. To further enhance the light signal transmission and reception, lenses with high coupling efficiency are preferably used and can be arranged on either or both the light source side and the spectrometer side. With the present invention, it is believed that the problems with respect to the component arrangement and signal reception have been adequately addressed.

In a preferred embodiment, an apparatus for spectral analysis comprises a first lens holder comprising a first lens; a second lens holder comprising a second lens, wherein the first lens and the second lens are configured to receive and focus a scattered light beam; a first optical fiber arranged between the first lens holder and the second lens holder, the first optical fiber configured to receive a first light beam focused by the first lens, transmit the first light beam through and project it onto the second lens; and a spectrometer positioned on a side of the second lens holder opposite the first optical fiber, wherein the second lens focuses the first light beam received from the first optical fiber and projects it onto the spectrometer, so that the spectrometer can analyze the first light beam.

According to at least one embodiment, the apparatus further comprises a first ferrule, wherein the first ferrule is combined with an end of the first optical fiber.

According to at least one embodiment, the apparatus further comprises a second ferrule, wherein the second ferrule is combined with another end of the first optical fiber.

According to at least one embodiment, the apparatus further comprises a first sleeve, wherein the first sleeve is sleeved upon an end of the first ferrule, the first ferrule is connected to the first lens holder via the first sleeve.

According to at least one embodiment, the first sleeve, the first ferrule, and the first lens holder are firmly connected to each other.

According to at least one embodiment, the apparatus further comprises a cushion positioned between the spectrometer and the second lens holder.

According to at least one embodiment, the cushion, the second ferrule, the second lens holder, and the spectrometer are firmly attached to each other.

According to at least one embodiment, the apparatus further comprises a first boot sleeved upon the first ferrule after being firmly connected to the first sleeve and the first lens holder.

According to at least one embodiment, the apparatus further comprises a second boot sleeved upon the second ferrule after being firmly attached to the cushion, the second lens holder, and the spectrometer.

In another preferred embodiment, an apparatus for spectral analysis comprises a first lens holder comprising a first lens; a second lens holder comprising a second lens; a third lens holder comprising a third lens, wherein the first lens, the second lens, and the third lens holder are configured to receive and focus a scattered light beam; a first optical fiber arranged between the first lens holder and the second lens holder, the first optical fiber configured to receive a first light beam focused by the first lens, transmit the first light beam through and project it onto the second lens; a second optical fiber arranged between the third lens holder and the second lens holder, wherein the second optical fiber is configured to receive a second light beam focused by the third lens, transmit the second light beam through and project it onto the second lens; and a spectrometer positioned on a side of the second lens holder opposite the first optical fiber and the second optical fiber, wherein the second lens focuses the first light beam and/or the second light beam received from the first optical fiber and/or the second optical fiber respectively and projects it onto the spectrometer, so that the spectrometer can analyze the first light beam and/or the second light beam.

According to at least one embodiment, the apparatus further comprises a third ferrule, wherein the third ferrule is combined with an end of the second optical fiber.

According to at least one embodiment, the apparatus further comprises a second sleeve, wherein the second sleeve is sleeved upon an end of the third ferrule, the third ferrule is connected to the third lens holder via the second sleeve.

According to at least one embodiment, the second sleeve, the third ferrule, and the third lens holder are firmly connected to each other.

According to at least one embodiment, the apparatus further comprises a third boot sleeved upon the third ferrule after being firmly connected to the second sleeve and the third lens holder.

As set forth above, the apparatus of spectral analysis according to the present invention utilizes one or more optical fibers as an optical propagation medium along with lenses with high coupling efficiency to achieve a better light signal reception and a more desirable arrangement of components.

BRIEF DESCRIPTION OF THE DRAWINGS

Unless specified otherwise, the accompanying drawings illustrate aspects of the innovative subject matter described herein. Referring to the drawings, wherein like reference numerals indicate similar parts throughout the several views, several examples of coaxial cable connector incorporating aspects of the presently disclosed principles are illustrated by way of example, and not by way of limitation.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

Figure 1:
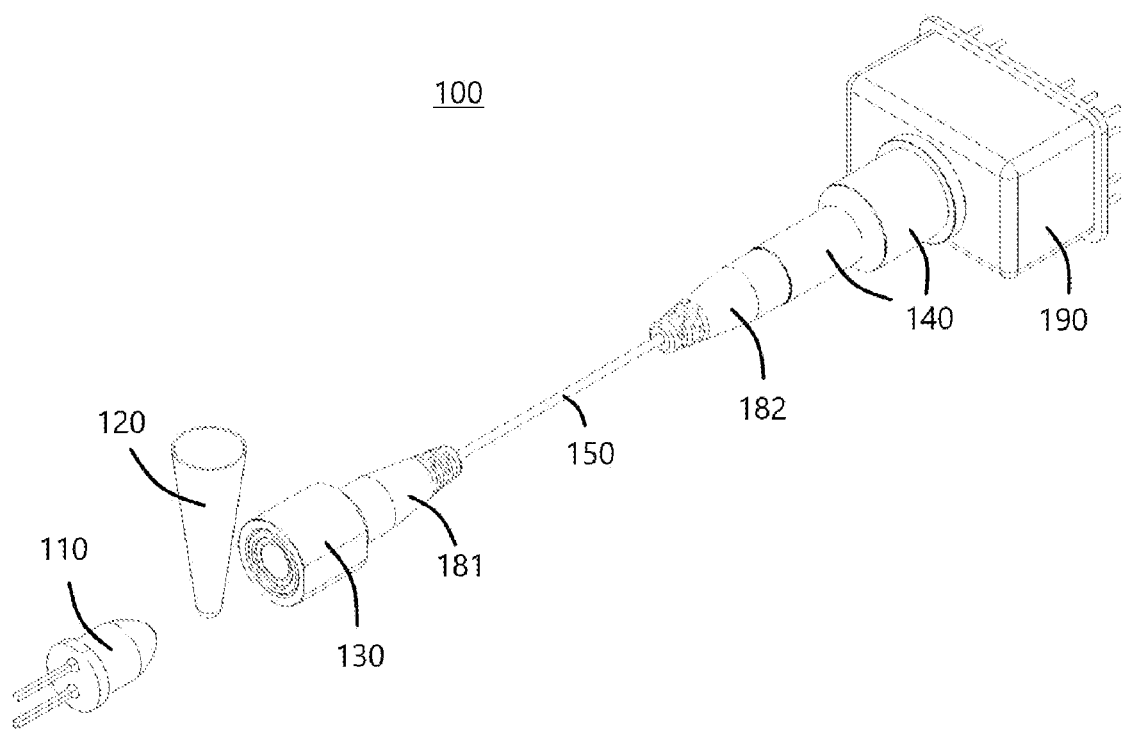
FIG. 1 illustrates a perspective view of a first embodiment of an apparatus for spectral analysis.
Figure 2:
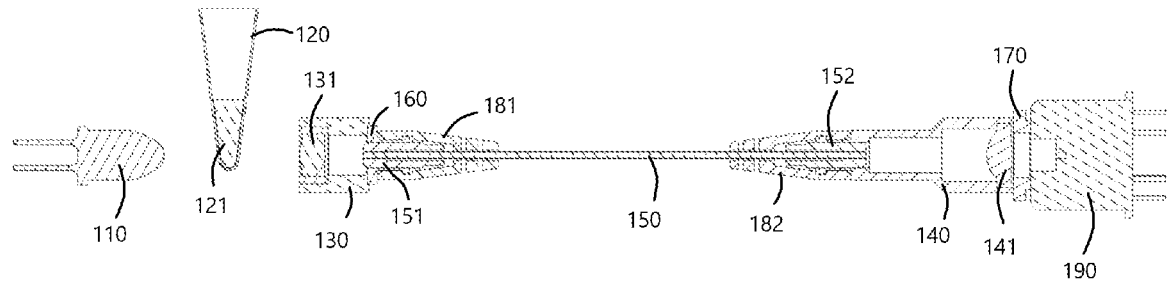
FIG. 2 illustrates a sectional view of the embodiment of FIG. 1.

Referring to FIGS. 1 and 2, FIGS. 1 and 2 show a first exemplary embodiment of an apparatus for spectral analysis according to the present invention. The apparatus for spectral analysis 100 comprises a light source 110, a test tube 120, a first lens holder 130 comprising a first lens 131, a second lens holder 140 comprising a second lens 141, an optical fiber 150, a first ferrule 151, a second ferrule 152, a sleeve 160, a cushion 170, a first boot 181, a second boot 182, and a spectrometer 190. The optical fiber 150 comprises two ends, which are combined with the first ferrule 151 and the second ferrule 152 respectively. The first ferrule 151 is connected to the first lens holder 130 via the sleeve 160 sleeved upon the end thereof, whereas the second ferrule 152 is directly connected to the second lens holder 140. The other end of the second lens holder 140 is connected to the spectrometer 190 through the cushion 170. The first boot 181 is sleeved outside of the first ferrule 151. The second boot 182 is sleeved outside of the second ferrule 152. The test tube 120 is placed between the light source 110 and the first lens holder 130.

A workflow of how to perform a spectral analysis using the first embodiment is described as follows. Firstly, a test sample 121 consisting of a fluorescent dye mixed with a collected sample taken from an organism is put in the test tube 120, and then a light beam coming from the light source 110 irradiates the test tube 120, which generates another light beam containing fluorescent characteristics, namely a first light beam. The first light beam is fluorescent scattered light. The first lens 131 focuses the first light beam onto the optical fiber 150, specifically on the end where the first ferrule 151 is located, the optical fiber 150 then transmits it through to another end where the second ferrule 152 is and projects it out. The first light beam projected out from the optical fiber 150 is scattered regularly in the air. The second lens 141 collects and focuses it onto the entrance slit of the spectrometer 190 so that the spectrometer 190 can analyze the light. In this way, the purpose of collecting and transmitting the fluorescent light containing virus data to the distant spectrometer 190 for viral analysis is achieved.

In at least one exemplary embodiment, the optical fiber 150, the first ferrule 151, and the second ferrule 152 are combined, and then a polishing process is applied to the end surface thereof.

In at least one exemplary embodiment, the best coupling efficiency is obtained by adjusting the first ferrule 151. In at least one exemplary embodiment, the most precise location is obtained by adjusting the sleeve 160 and the first lens holder 130. When performing the abovementioned actions, another end of the optical fiber 150 can be connected to an optical power meter to monitor the power to determine the locations of the first ferrule 151, the sleeve 160, or the first lens holder 130 giving the maximum optical power. The first lens 131 and the first lens holder 130 are firmly connected, which can be done with adhesive gels. When the maximum optical power is obtained, the sleeve 160 is firmly attached to the first lens holder 130 and the first ferrule 151 respectively, which can be done by laser welding. After that, the first boot 181 is sleeved upon the first ferrule 151 for protection and fixation.

In at least one exemplary embodiment, the best focusing point which collects and provides the strongest light signal to the spectrometer 190 is found by adjusting and/or moving the second ferrule 152, the second lens holder 140, and the second lens 141. In at least one exemplary embodiment, the cushion 170 is added as a connector between the spectrometer 190 and the second lens holder 140 because the surface of the spectrometer 190 is fragile that cannot be laser welded. The cushion 170 and the spectrometer 190 are firmly connected, which can be done with adhesive gels. The second lens 141 and the second lens holder 140 are firmly connected, which can be done with adhesive gels. Subsequently, the second lens holder 140 is firmly attached to the second ferrule 152 and the cushion 170 respectively, which can be done by laser welding. After that, the second boot 182 is sleeved upon the second ferrule 152 for protection and fixation.

In at least one exemplary embodiment, the light source 110 adopted in the present invention includes a light emitting diode (LED), a laser, or other light sources having wavelengths being consistent with the absorption wavelengths of the fluorescent dyes, and these light sources also may be incorporated for use.

In at least one exemplary embodiment, the first lens 131 and the second lens 141 adopted in the present invention may be: aspheric lenses, biconvex lenses, piano-convex lenses, doublet lenses, achromatic lenses, spherical lenses, anastigmatic lenses, Fresnel lenses, piano-concave lenses, biconcave lenses, positive/negative meniscus lenses, axicons, gradient index lenses, micro-lens arrays, cylindrical lenses, waveguide elements, diffractive optical elements, holographic optical elements, or a combination thereof.

In at least one exemplary embodiment, the first lens 131 and the second lens 141 have different curvatures.

In at least one exemplary embodiment, the cushion 170, the first lens holder 130, and the second lens holder 140 can be made of metal, preferably stainless steel. In at least one exemplary embodiment, the sleeve 160, the first ferrule 151, and the second ferrule 152 can be made of metal. In at least one exemplary embodiment, the first boot 181 and the second boot 182 can be made of rubber.

In at least one exemplary embodiment, the test tube 120 is a reagent container. In at least one exemplary embodiment, the test tube 120 can be placed in a test tube holding mechanism.

Figure 3:
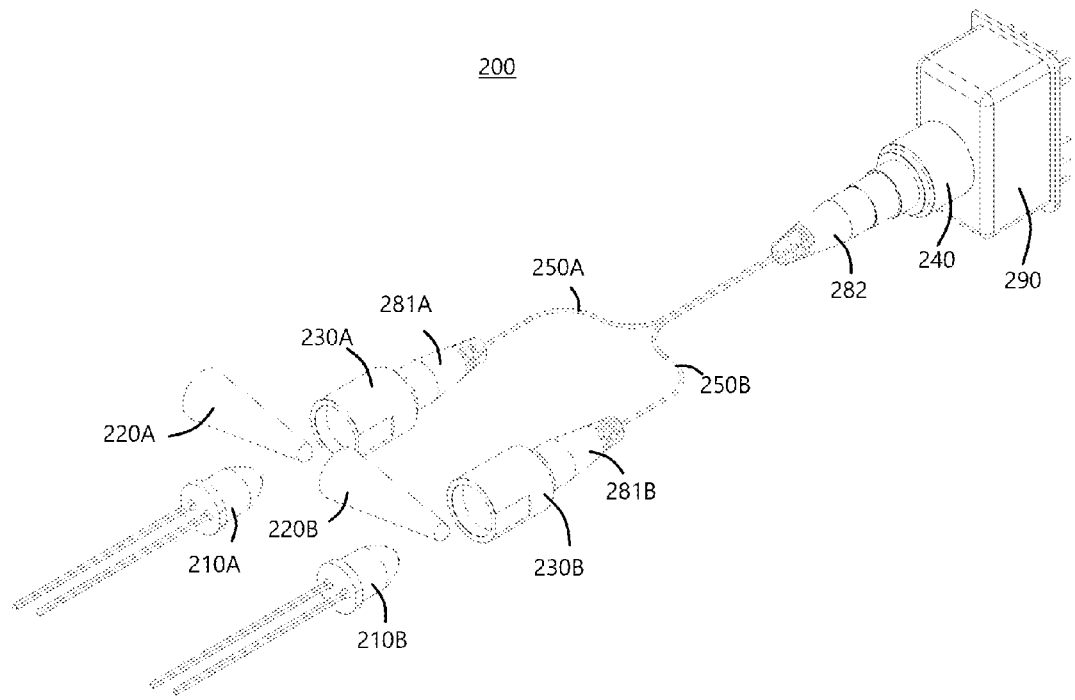
FIG. 3 illustrates a perspective view of a second embodiment of an apparatus for spectral analysis.
Figure 4:
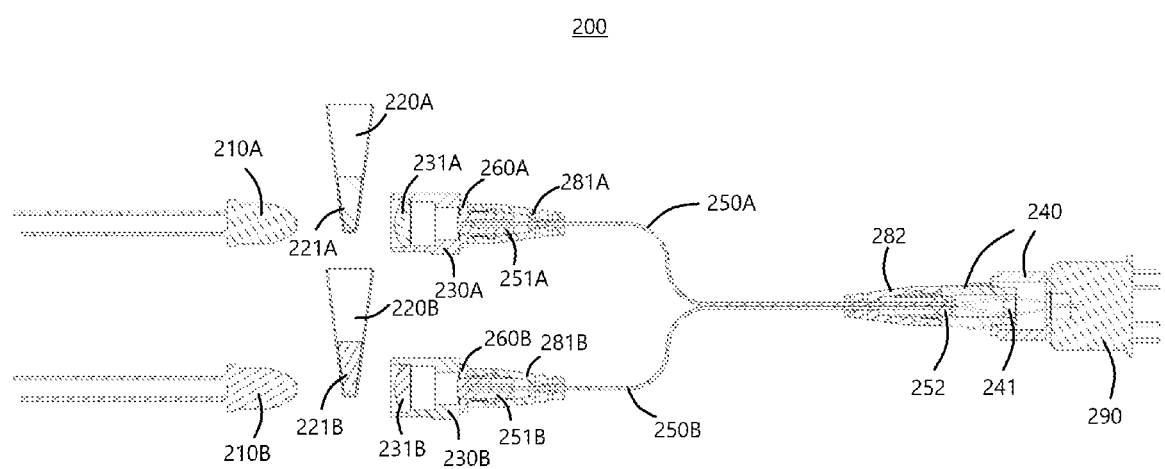
FIG. 4 illustrates a sectional view of the embodiment of FIG. 3.

Referring to FIGS. 3 and 4, FIGS. 3 and 4 show a second exemplary embodiment of an apparatus for spectral analysis according to the present invention. The apparatus for spectral analysis 200 comprises a first light source 210A, a second light source 210B, a first test tube 220A, a second test tube 220B, a first lens holder 230A comprising a first lens 231A, a second lens holder 240 comprising a second lens 241, a third lens holder 230B comprising a third lens 231B, a first optical fiber 250A, a second optical fiber 250B, a first ferrule 251A, a second ferrule 252, a third ferrule 251B, a first sleeve 260A, a second sleeve 260B, a cushion (not shown in FIGS.), a first boot 281A, a second boot 282, a third boot 281B, and a spectrometer 290. The first optical fiber 250A and the second optical fiber 250B comprise two ends respectively, in which the two ends of the first optical fiber 250A are combined with the first ferrule 251A and the second ferrule 252 respectively; similarly, the two ends of the second optical fiber 250B are combined with the third ferrule 251B and the second ferrule 252 respectively. This means the second ferrule 252 is attached to one end of the two optical fibers 250A, 250B respectively. The first ferrule 251A is connected to the first lens holder 230A via the first sleeve 260A sleeved upon the end thereof. The third ferrule 251B is connected to the third lens holder 230B via the second sleeve 260B sleeved upon the end thereof. On the other hand, the second ferrule 252 is directly connected to the second lens holder 240, in which the other end of the second lens holder 240 is connected to the spectrometer 290 through the cushion (not shown in FIGS.). The first boot 281A is sleeved outside of the first ferrule 251A. The second boot 282 is sleeved outside of the second ferrule 252. The third boot 281B is sleeved outside of the third ferrule 251B. The first test tube 220A is placed between the first light source 210A and the first lens holder 230A. The second test tube 220B is placed between the second light source 210B and the third lens holder 230B.

A workflow of how to perform a spectral analysis using the second embodiment is described as follows. Firstly, a first test sample 221A consisting of a fluorescent dye mixed with a collected sample taken from an organism is put in the first test tube 220A and a second test sample 221B consisting of a fluorescent dye mixed with another collected sample taken from another organism is put in the second test tube 220B. Then, two light beams respectively coming from the first light source 210A and the second light source 210B irradiate the first test tube 220A and the second test tube 220B respectively, which generate another two light beams corresponding to the first and second test tubes 220A, 220B containing fluorescent characteristics, namely a first light beam and a second light beam. The first light beam and the second light beam are fluorescent scattered light. The first lens 231A focuses the first light beam onto the first optical fiber 250A, specifically on the end where the first ferrule 251A is located, the first optical fiber 250A then transmits the first light beam through to another end where the second ferrule 252 is situated and projects the first light beam out, similarly, the third lens 231B focuses the second light beam onto the second optical fiber 250B, specifically on the end where the third ferrule 251B is located, the second optical fiber 250B then transmits the second light beam through to another end where the second ferrule 252 is situated and projects the second light beam out. The first light beam and the second light beam projected out from the corresponding first and second optical fibers 250A, 250B are scattered regularly in the air. The second lens 241 collects and focuses the two light beams respectively onto the entrance slit of the spectrometer 290 so that the spectrometer 290 can analyze the light beams. In this way, the purpose of collecting and transmitting the fluorescent light containing virus data to the distant spectrometer 290 for viral analysis is achieved.

In at least one exemplary embodiment, the first light beam and the second light beam are determined by time difference of arrival techniques. The first light beam and the second light beam are not simultaneously transmitted and projected out by the corresponding first and second optical fibers 250A, 250B, instead, they are transmitted and projected out in different time slots.

In at least one exemplary embodiment, the first optical fiber 250A, the first ferrule 251A and the second ferrule 252 are combined, and then a polishing process is applied to the end surface thereof. In at least one exemplary embodiment, the second optical fiber 250B, the third ferrule 251B and the second ferrule 252 are combined, and then a polishing process is applied to the end surface thereof.

In at least one exemplary embodiment, the best coupling efficiency is obtained by adjusting the first ferrule 251A and the third ferrule 251B respectively. In at least one exemplary embodiment, the most precise location is obtained by respectively adjusting a combination of the first sleeve 260A and the first lens holder 230A, and a combination of the second sleeve 260B and the third lens holder 230B. When performing the abovementioned actions, the other ends of the first optical fiber 250A and/or the second optical fiber 250B can be connected to an optical power meter to monitor the power to determine the locations of the first ferrule 251A, the third ferrule 251B, the first sleeve 260A, the second sleeve 260B, the first lens holder 230A, or the third lens holder 230B giving the maximum optical power. The first lens 231A and the first lens holder 230A are firmly connected, which can be done with adhesive gels. The third lens 231B and the third lens holder 230B are firmly connected, which can be done with adhesive gels. In at least one exemplary embodiment, when the maximum optical power is obtained, the first sleeve 260A is firmly attached to the first lens holder 230A and the first ferrule 251A respectively, which can be done by laser welding. After that, the first boot 281A is sleeved upon the first ferrule 251A for protection and fixation. In at least one exemplary embodiment, when the maximum optical power is obtained, the second sleeve 260B is firmly attached to the third lens holder 230B and the third ferrule 251B respectively, which can be done by laser welding. After that, the third boot 281B is sleeved upon the third ferrule 251B for protection and fixation.

In an exemplary embodiment of using a plurality of optical fibers, to collect and deliver the strongest light signal to the spectrometer 290, the optimal focusing point is found by adjusting, moving, and/or rotating the second ferrule 252, the second lens holder 240, and the second lens 241 in multiple axes.

In at least one exemplary embodiment, the first light source 210A and the second light source 210B adopted in the present invention include a light emitting diode (LED), a laser, or other light sources having wavelengths being consistent with the absorption wavelengths of the fluorescent dyes, and these light sources also may be incorporated for use.

In at least one exemplary embodiment, the first lens 231A, the second lens 241, and the third lens 231B adopted in the present invention may be: aspheric lenses, biconvex lenses, piano-convex lenses, doublet lenses, achromatic lenses, spherical lenses, anastigmatic lenses, Fresnel lenses, piano-concave lenses, biconcave lenses, positive/negative meniscus lenses, axicons, gradient index lenses, micro-lens arrays, cylindrical lenses, waveguide elements, diffractive optical elements, holographic optical elements, or a combination thereof.

In at least one exemplary embodiment, the curvatures of the first lens 231A and the third lens 231B are the same, but different to the curvature of the second lens 241. In at least one exemplary embodiment, the curvatures of the first lens 231A, the second lens 241, and the third lens 231B are different.

In at least one exemplary embodiment, the cushion (not shown in FIGS.), the first lens holder 230A, the second lens holder 240, and the third lens holder 230B can be made of metal, preferably stainless steel. In at least one exemplary embodiment, the first sleeve 260A, the second sleeve 260B, the first ferrule 251A, the second ferrule 252, and the third ferrule 251B can be made of metal. In at least one exemplary embodiment, the first boot 281A, the second boot 282, and the third boot 281B can be made of rubber.

In at least one exemplary embodiment, the first test tube 220A and the second test tube 220B are reagent containers. In at least one exemplary embodiment, the first test tube 220A and the second test tube 220B can be placed in test tube holding mechanisms.

As set forth above, the present invention utilizes one or more optical fibers placed between the test samples and the spectrometer to act as an optical propagation medium, so that the locations of the test samples and the spectrometer are not limited. The spectrometer can be placed anywhere that is designated as an analytical instrument area, and thus no longer has to be combined or put near the test samples, consequently solving the problem of component arrangements. Furthermore, lenses with high coupling efficiency can be arranged on either or both sides of the optical fiber, preferably on the side facing the spectrometer, to solve the problem in the prior art of the weak light signal reception of the spectrometer because the entrance slit of the spectrometer is too small to capture strong light signals.

The presently disclosed inventive concepts are not intended to be limited to the embodiments shown herein, but are to be accorded their full scope consistent with the principles underlying the disclosed concepts herein. Directions and references to an element, such as "up," "down,", "upper," "lower," "horizontal," "vertical," "left," "right," and the like, do not imply absolute relationships, positions, and/or orientations. Terms of an element, such as "first" and "second" are not literal, but, distinguishing terms. As used herein, terms "comprises" or "comprising" encompass the notions of "including" and "having" and specify the presence of elements, operations, and/or groups or combinations thereof and do not imply preclusion of the presence or addition of one or more other elements, operations and/or groups or combinations thereof. Sequence of operations do not imply absoluteness unless specifically so stated. Reference to an element in the singular, such as by use of the article "a" or "an", is not intended to mean "one and only one" unless specifically so stated, but rather "one or more". As used herein, "and/or" means "and" or "or", as well as "and" and "or." As used herein, ranges and subranges mean all ranges including whole and/or fractional values therein and language which defines or modifies ranges and subranges, such as "at least," "greater than," "less than," "no more than," and the like, mean subranges and/or an upper or lower limit. All structural and functional equivalents to the elements of the various embodiments described throughout the disclosure that are known or later come to be known to those of ordinary skill in the relevant art are intended to be encompassed by the features described and claimed herein. Moreover, nothing disclosed herein is intended to be dedicated to the public regardless of whether such disclosure may ultimately explicitly be recited in the claims. No element or concept disclosed herein or hereafter presented shall be construed under the provisions of 35 USC 112(f) unless the element or concept is expressly recited using the phrase "means for" or "step for".

In view of the many possible embodiments to which the disclosed principles can be applied, we reserve the right to claim any and all combinations of features and acts described herein, including the right to claim all that comes within the scope and spirit of the foregoing description, as well as the combinations recited, literally and equivalently, in the following claims and any claims presented anytime throughout prosecution of this application or any application claiming benefit of or priority from this application.

What is claimed is:

1. An apparatus for a spectral analysis, comprising:
   a first lens holder comprising a first lens;
   a second lens holder comprising a second lens, wherein the first lens and the second lens are configured to receive and focus a scattered light beam;
   a first optical fiber arranged between the first lens holder and the second lens holder, the first optical fiber configured to receive a first light beam focused by the first lens, transmit the first light beam through and project the first light beam onto the second lens; and
   a spectrometer positioned on a side of the second lens holder opposite the first optical fiber, wherein the second lens focuses the first light beam received from the first optical fiber and projects the first light beam onto the spectrometer, so that the spectrometer can analyze the first light beam.

2. The apparatus of claim 1, further comprising a first ferrule, wherein the first ferrule is combined with an end of the first optical fiber.

3. The apparatus of claim 2, further comprising a second ferrule, wherein the second ferrule is combined with another end of the first optical fiber.

4. The apparatus of claim 3, further comprising a cushion positioned between the spectrometer and the second lens holder.

5. The apparatus of claim 4, wherein the cushion, the second ferrule, the second lens holder, and the spectrometer are firmly attached to each other.

6. The apparatus of claim 5, further comprising a second boot sleeved upon the second ferrule after being firmly attached to the cushion, the second lens holder, and the spectrometer.

7. The apparatus of claim 2, further comprising a first sleeve, wherein the first sleeve is sleeved upon an end of the first ferrule, the first ferrule is connected to the first lens holder via the first sleeve.

8. The apparatus of claim 7, wherein the first sleeve, the first ferrule, and the first lens holder are firmly connected to each other.

9. The apparatus of claim 8, further comprising a first boot sleeved upon the first ferrule after being firmly connected to the first sleeve and the first lens holder.

10. The apparatus of claim 1, further comprising:
    a third lens holder comprising a third lens; and
    a second optical fiber arranged between the third lens holder and the second lens holder,
    wherein the second optical fiber is configured to receive a second light beam focused by the third lens, and transmit the second light beam through and project the second light beam onto the second lens.

11. The apparatus of claim 10, further comprising a third ferrule, wherein the third ferrule is combined with an end of the second optical fiber.

12. The apparatus of claim 11, further comprising a second sleeve, wherein the second sleeve is sleeved upon an end of the third ferrule, the third ferrule is connected to the third lens holder via the second sleeve.

13. The apparatus of claim 12, wherein the second sleeve, the third ferrule, and the third lens holder are firmly connected to each other.

14. The apparatus of claim 13, further comprising a third boot sleeved upon the third ferrule after being firmly connected to the second sleeve and the third lens holder.

* * * * *